United States Patent [19]

Paukku

[11] 4,453,878
[45] Jun. 12, 1984

[54] LOCK DEVICE FOR LOADING EQUIPMENT

[75] Inventor: Teuvo Paukku, Raisio, Finland

[73] Assignee: OY Partek AB, Raisio, Finland

[21] Appl. No.: 343,267

[22] Filed: Jan. 27, 1982

[30] Foreign Application Priority Data

Feb. 12, 1981 [FI] Finland .................................. 810430

[51] Int. Cl.$^3$ ............................................. B60P 1/64
[52] U.S. Cl. .................................... 414/491; 414/421;
414/498; 414/546
[58] Field of Search ............... 414/420, 421, 491, 498,
414/546, 555

[56] References Cited

U.S. PATENT DOCUMENTS 3,892,323 7/1975 Corompt ........................... 414/491
4,350,469 9/1982 Corompt ........................ 414/491 X

FOREIGN PATENT DOCUMENTS 1371811 10/1974 United Kingdom .
1489113 10/1977 United Kingdom .
1551936 9/1979 United Kingdom .
2033346 5/1980 United Kingdom .

Primary Examiner—Robert G. Sheridan
Attorney, Agent, or Firm—Burns, Koane, Swecker & Mathis

[57] ABSTRACT

The present invention relates to loading equipment comprising a hook-device type arm construction which includes a rear frame, a middle frame, and an angle piece. An upper end of the vertical part of the angle piece is provided with a hook for engaging a corresponding grasping component at the front wall of the exchange platform. The rear frame of the loading equipment and the base construction of the exchange platform are provided with jointly operative locking arrangements for locking the exchange platform onto the loading equipment. The rear frame of the loading equipment is provided with safety catches placed at each side of the rear frame and arranged so that, when the exchange platform is being dumped, they pivot into the locking position, in which they prevent shifting of the exchange platform backwards in relation to the loading equipment, but the safety catches are opened when the rear frame is turned to the horizontal position. The locking arrangements include transverse locking pins fitted to the truck frame and locking levers fitted to the rear frame of the loading equipment with the levers being forced by the exchange platform in the transport position to the open position. The rear frame is secured to the truck frame when the exchange platform rises off the rear frame while the exchange platform is being loaded or removed.

4 Claims, 5 Drawing Figures

LOCK DEVICE FOR LOADING EQUIPMENT

BACKGROUND AND SUMMARY OF THE PRESENT INVENTION

The subject of the present invention is a lock device for a loading equipment consisting of a hook-device type arm construction which comprises a rear frame mounted pivotably by means of a transversal, horizontal shaft or articulated joints placed at the rear end of the frame beams of a truck. A middle frame of the loading equipment is pivotably mounted at one of its ends to the rear frame by a transversal, horizontal shaft or articulated joints. At one end of the middle frame an angle piece is mounted as pivotable by means of a transversal, horizontal shaft or articulated joints around the rear end of its horizontal part or parts. The vertical part of the angle piece is at its upper end provided with a grasping means, such as, e.g., a hook, for the purpose of engaging a corresponding grasping component at the front wall of the exchange platform or any other load space. A main cylinder or two parallel main cylinders operating the loading equipment are arranged so that one of their ends is fastened to the frame of the truck and the opposite end to the middle frame of the loading equipment. For the purpose of pivoting the angle piece independently in relation to the middle frame, a cylinder-piston device is arranged between the angle piece and the middle frame, and the rear frame of the loading equipment and the base construction of the exchange platform or any other load space are provided with jointly operative locking means for the purpose of locking the exchange platform or any other load space onto the loading equipment as the exchange platform or any other load space has been pulled into its front position.

When dumping is performed by means of a hook-device type loading equipment, the dumping frequently takes place so that the arm construction of the loading equipment is locked to the base of the exchange platform. This locking has not been secured in any way, and, under these circumstances, if the exchange platform can glide downwards in the dumped position, the locking is opened and the arm construction of the loading equipment can be released downwards at the articulated joint between the rear frame and the middle frame.

An object of the present invention is to eliminate the above mentioned drawback and others. The lock device in accordance with the invention is characterized in that the rear frame of the loading equipment is provided with safety catches placed at both sides of the rear frame so that, when the exchange platform or any other load space is being dumped, the safety catches pivot into the locking position, in which they prevent shifting of the exchange platform or any other load space backwards in relation to the loading equipment. However, the safety catches are opened when the rear frame is turned to the horizontal position, and, moreover, locking means are preferably provided between the truck frame and the rear frame of the loading equipment. The locking means consist of transverse locking pins fitted to the truck frame and of locking levers fitted to the rear frame of the loading equipment and jointly operative with the locking pins. The levers are forced by the exchange platform forced in the transport position forced to the open position, whereas the rear frame is secured to the truck frame when the exchange platform or any other load space rises off the rear frame while the exchange platform or any other load space is being loaded onto the truck chassis or removed from same.

BRIEF DESCRIPTION OF THE DRAWINGS

The present invention will be described in greater detail from the following description and from the attached drawings, wherein.

DETAILED DESCRIPTION OF THE PREFERRED EMBODIMENTS

Figure 1:
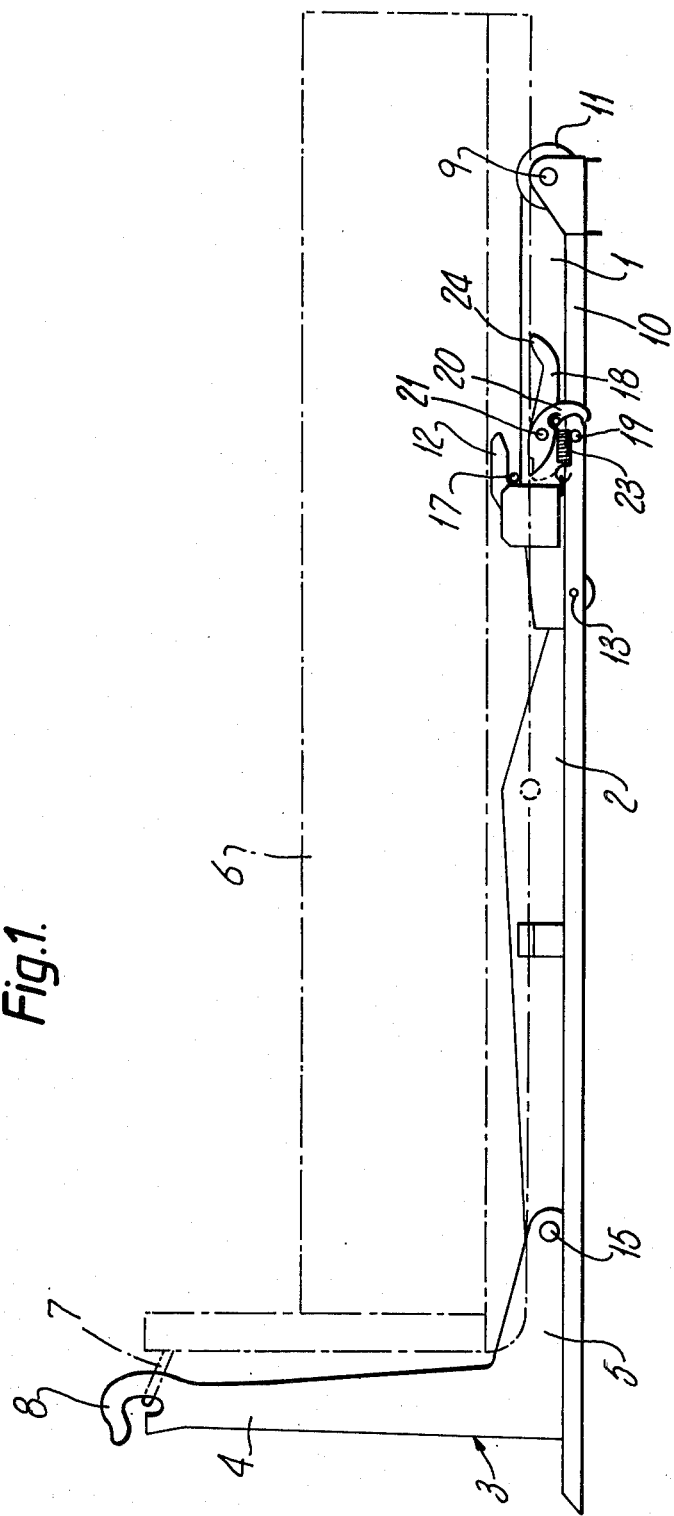
FIG. 1 is a side view of a hook-device type loading equipment provided with a lock device in the transport position.

The loading equipment comprises three frame parts: the rear frame 1, the middle frame 2, and the angle piece 3. The rear frame is at its rear part, by means of articulated joints 9, fastened to the rear end of the frame construction 10 of the truck. The rear frame 1 pivots around the articulated joints 9 in relation to the frame construction 10, i.e. the rear frame 1 can be pivoted in relation to the frame construction 10 into the ordinary dumping position. The rear end of the rear frame 1 is provided with support rollers 11 for supporting and guiding the exchange platform 6 during loading. The rear frame 1 also includes locking projections 12 for locking the exchange platform 6 onto the loading equipment. The middle frame 2 is at one of its ends fastened to the rear frame pivotably by means of a transversal, horizontal shaft or by articulated joints 13. The front end of the rear frame 1 of the loading equipment extends forwards essentially beyond the articulated joint between the rear frame 1 and the middle frame 2. Two parallel main cylinder devices 14 are arranged between the middle frame 2 and the frame construction 10 of the truck.

An angle piece 3 is fastened to the front end of the middle frame 2 or to immediate proximity of the front end of the middle frame 2 as pivotable at the rear ends of the horizontal parts 5 in relation to a transversal horizontal shaft or to articulated joints 15. The vertical part 4 of the angle piece 3 is at the upper end provided with a grasping means, such as a hook 8, for engaging a corresponding grasping component 7 at the front wall of the exchange platform 6 or container. For the purpose of pivoting the angle piece 3 independently in relation to the middle frame 2, a cylinder-piston device 16 has been arranged between the angle piece 3 and the middle frame 2.

In detail, a loading equipment of the type shown in FIG. 1 is disclosed in the German published patent application DE No. 29 23 916.5.

As is shown in the figures, in the front part of the rear frame 1, on its both sides at the free end of the locking projection 12, there is a transversal shaft 21, onto which both a safety catch 18 and a locking lever 20 are pivotably mounted. Both the safety catches 18 and the locking levers 20 are provided with springs 22 and 23, which tend to pivot them into the locking position.

When the exchange platform 6 is in the transport position shown in FIG. 1, both the safety catches 18 and the locking levers 20 are in the open position. The safety catches 18 are in the open position, because their pivot arms 24 rest against the frame beams 10 of the vehicle and thereby keep the locking ends 25 of the safety catches 18 in the horizontal position. On the other hand, the pivot arms 26 of the locking levers 20 are pressed down by the bottom beams of the exchange platform 6, whereby the hooks 27 of the locking levers 20 pivot away from the locking pins 19.

Figure 3:
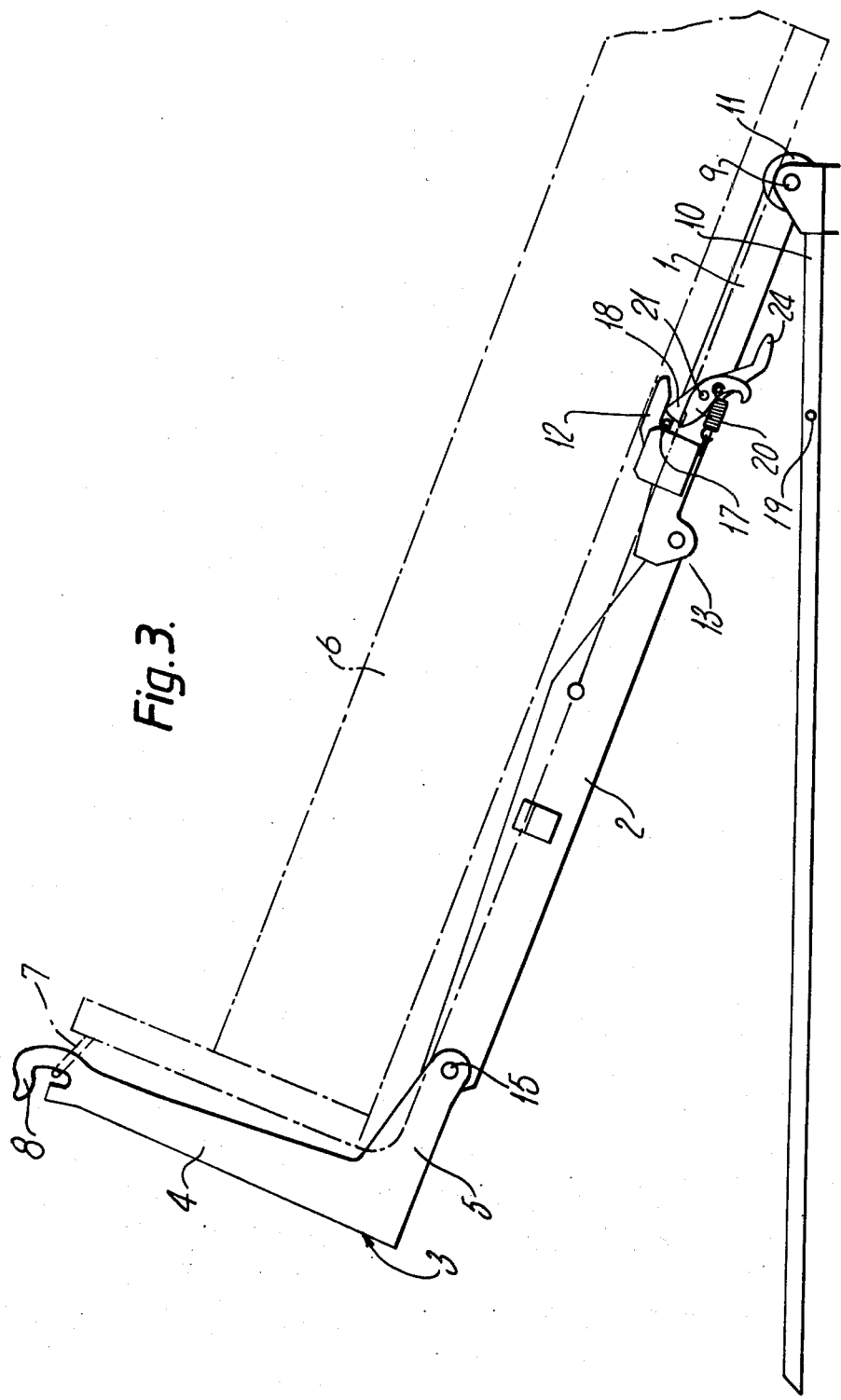
FIG. 3 is a side view of the loading equipment shown in FIG. 1 in the dumped position.
Figure 4:
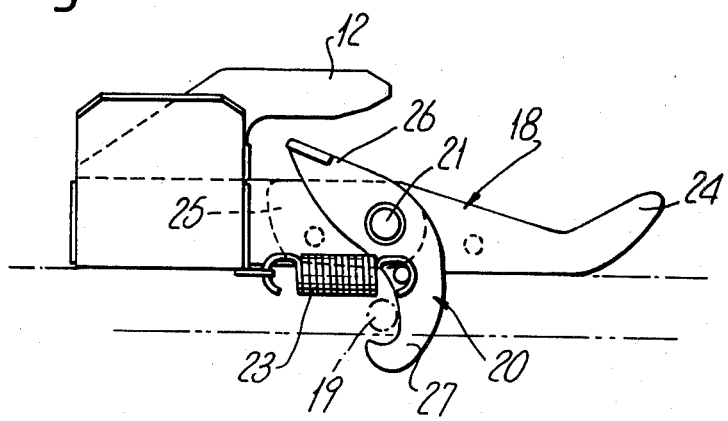
FIG. 4 is an enlarged side view of the lock device.
Figure 5:
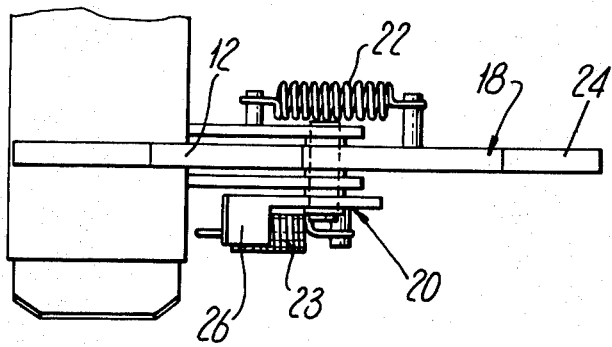
FIG. 5 is a view of the lock device shown in FIG. 4, as viewed from above.

When dumping of the exchange platform 6 is started, the locking lever 20 remains all the time in the open position, for the bottom beams of the exchange platform 6 constantly press against the pivot arms 26 of the locking levers 20. The locking pins 17 projecting from the sides of the bottom beams of the exchange platform 6 are placed underneath the locking projections of the rear frame 1 of the loading equipment and thereby together form a locking between the exchange platform 6 and the arm construction of the loading equipment. When the dumping of the exchange platform 6 is started, the rear frame 1 at the same time rises from the top of the frame construction 10, being pivoted around the articulated joints 9, whereby the pivot arm 24 of the safety catch 18 becomes free and is allowed to pivot down. The springs 22 pivot the safety catches into the locking position shown in FIG. 3, whereby the locking ends 25 of the safety catches 18 prevent the locking pins 17 from gliding backwards underneath the locking projections. When the exchange platform 6 is lowered back into the transport position, the pivot arms 24, when meeting the frame construction 10, pivot the safety catches towards the open position, and the locking ends 25 are pivoted to the open position as shown in FIGS. 1 and 4.

Figure 2:
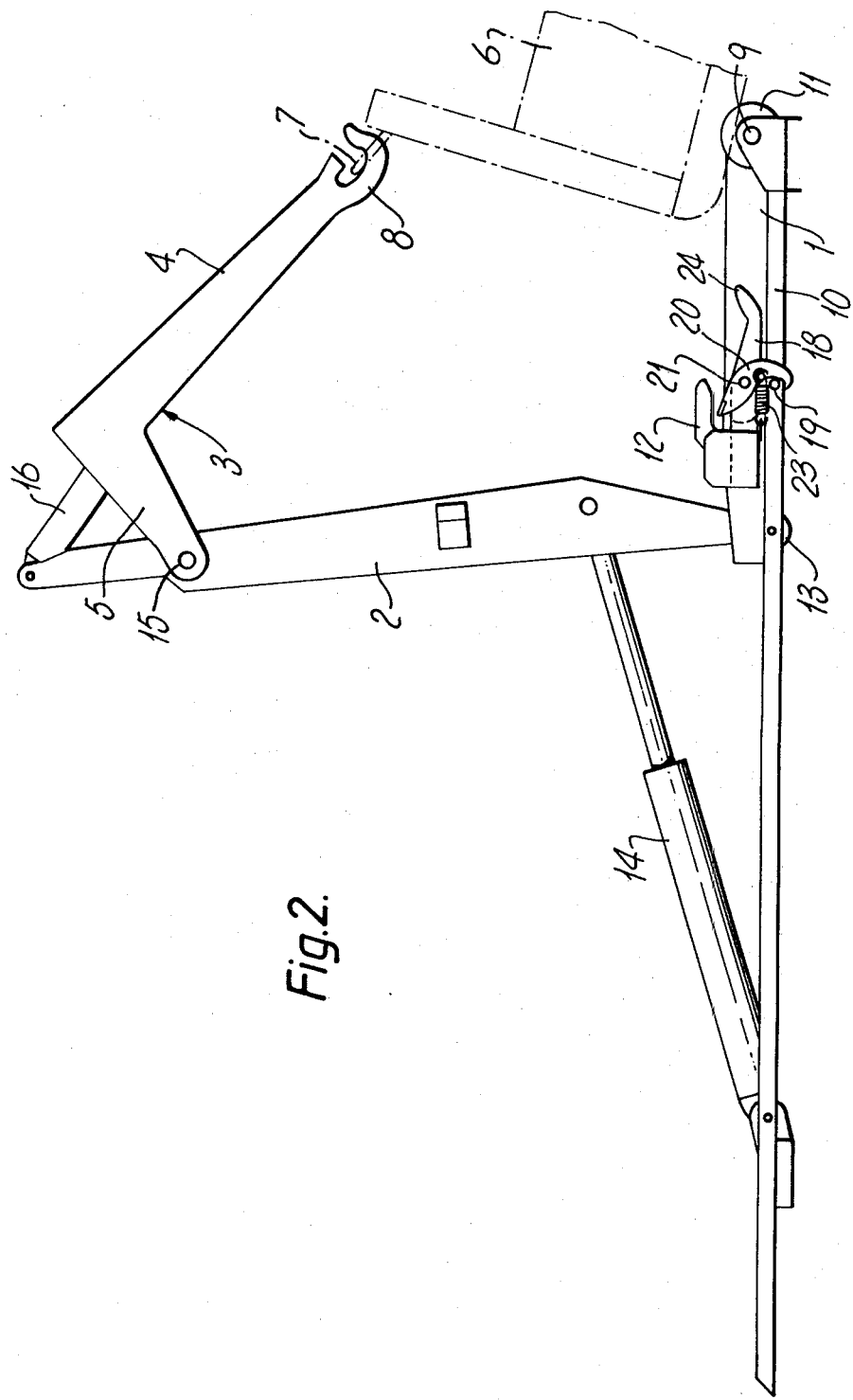
FIG. 2 is a side view of the loading equipment shown in FIG. 1 in the bent position.

When an exchange platform 6 is being lowered onto the ground by means of a hook-device type loading equipment and if the exchange platform 6 then meets an obstacle so that the platform 6 cannot move further backwards and, on the other hand, if the truck cannot be moved forwards, e.g. owing to difficult ground conditions, it is very difficult to lower the platform onto the ground and to get rid of the obstacle because the rear frame 1 tends to rise. The objective of the locking levers 20 is to overcome this problem. When the exchange platform 6 starts being removed from the vehicle, as is shown in FIG. 2, the pivot arms 26 of the locking levers 20 become free and the locking levers 20 turn into the locking position around the locking pins 19, as is shown in FIGS. 2 and 4. In this way the locking levers 20 prevent rising of the rear frame 1 off the frame construction 10 of the truck. When the exchange platform is restored to the transport position, the bottom beams of the exchange platform 6 press the pivot arms 26 of the locking levers down, whereby the locking levers 20 pivot around the shafts 21 and the hooks 27 thereby move away from around the locking pins 19.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A loading equipment consisting of a hook-device type arm construction, comprising a rear frame mounted pivotably at a rear end of a frame of a truck, a middle frame of the loading equipment being pivotably mounted to the rear frame at one of its ends by articulated joints, one end of the middle frame having an angle piece pivotably mounted around a rear end of a horizontal part of the angle piece, a vertical part of the angle piece being at its upper end provided with a grasping means for engaging a corresponding grasping component at a front wall of an exchange platform, at least one main piston-cylinder for operating the loading equipment being arranged such that one end of the piston-cylinder is fastened to the frame of the truck and the other end to the middle frame of the loading equipment, a second piston-cylinder for pivoting the angle piece independently in relation to the middle frame being arranged between the angle piece and the middle frame, the rear frame of the loading equipment and a base construction of the exchange platform being provided with jointly operative locking means for locking the exchange platform onto the loading equipment as the exchange platform is pulled into its front position, the rear frame of the loading equipment being provided with safety catches placed at each side of the rear frame and being arranged so that, when the exchange platform is being dumped, the safety catches pivot into the locking position in which the safety catches prevent shifting of the exchange platform backwards in relation to the loading equipment, the safety catches being opened when the rear frame is turned to the horizontal position, the locking means being arranged between the truck frame and the rear frame of the loading equipment, the locking means including transverse locking pins fitted to the truck frame and locking levers fitted to the rear frame of the loading equipment and jointly operative with the locking pins, the levers being forced by the exchange platform in the transport position to the open position such that the rear frame is secured to the truck frame when the exchange platform rises off the rear frame while the exchange platform is being loaded onto the truck frame or removed from same.

2. The loading equipment as claimed in claim 1, wherein on each side of the loading equipment, both the safety catch and the locking lever are mounted on a common shaft.

3. The loading equipment as claimed in claim 1, wherein both the safety catches and the locking levers are provided with springs which tend to pivot them into the locking position.

4. The loading equipment as claimed in claim 2, wherein both the safety catches and the locking levers are provided with springs which tend to pivot them into the locking position.

* * * * *